(12) United States Patent
Youn et al.

(10) Patent No.: US 9,587,111 B2
(45) Date of Patent: Mar. 7, 2017

(54) POLYAMIDE COMPOSITE RESIN COMPOSITION FOR FUEL FILLER PIPE

(71) Applicants: HYUNDAI MOTOR COMPANY, Seoul (KR); SHINIL CHEMICAL INDUSTRY CO., LTD., Ansan-si, Gyeonggi-do (KR)

(72) Inventors: Jee Young Youn, Incheon (KR); Dong Yol Ryu, Jecheon-si (KR); Keum Suk Seo, Ansan-si (KR)

(73) Assignees: HYUNDAI MOTOR COMPANY, Seoul (KR); SHINIL CHEMICAL INDUSTRY CO., LTD., Ansan-si, Gyeonggi-do (KR)

( * ) Notice: Subject to any disclaimer, the term of this patent is extended or adjusted under 35 U.S.C. 154(b) by 0 days.

(21) Appl. No.: 14/972,030

(22) Filed: Dec. 16, 2015

(65) Prior Publication Data

US 2016/0362553 A1   Dec. 15, 2016

(30) Foreign Application Priority Data

Jun. 15, 2015   (KR) ........................ 10-2015-0084351

(51) Int. Cl.
  *C08L 77/02*   (2006.01)
  *C08K 3/34*    (2006.01)
  *C08L 77/06*   (2006.01)

(52) U.S. Cl.
  CPC ................................... *C08L 77/06* (2013.01)

(58) Field of Classification Search
  CPC ............. C08L 2666/20; C08L 2666/24; C08L 2666/62; C08K 3/346
  USPC .................................................. 524/445, 606
  See application file for complete search history.

(56) References Cited

U.S. PATENT DOCUMENTS

2011/0217495 A1*   9/2011   Stoeppelmann ........ B32B 27/00
                                                    428/35.7

FOREIGN PATENT DOCUMENTS

| KR | 10-2006-0120548 A | 11/2006 |
| KR | 10-0789245 B1 | 1/2008 |
| KR | 10-0885617 B1 | 2/2009 |
| KR | 10-2009-0073847 A | 7/2009 |
| KR | 10-1002050 B1 | 12/2010 |
| KR | 10-2011-0012430 A | 2/2011 |
| KR | 10-2011-0052265 A | 5/2011 |
| KR | 10-2011-0064024 A | 6/2011 |
| KR | 10-2012-0075923 A | 7/2012 |
| WO | 2007/123695 A2 | 11/2007 |

OTHER PUBLICATIONS

Fereydoon et al., Journal of Plastic Film & Sheeting 2015, 31(1), 45-77.*

* cited by examiner

*Primary Examiner* — Vu A Nguyen
(74) *Attorney, Agent, or Firm* — McDermott Will & Emery LLP

(57) ABSTRACT

A polyamide composite resin composition for a fuel filler pipe, the polyamide composite resin includes 41 to 77% by weight of polyamide 6, 5 to 15% by weight of m-xylene-diamine (MXD)-based modified nylon, 14 to 30% by weight of a maleic anhydride-grafted ethylene-octene copolymer, a maleic anhydride-grafted ethylene-propylene-diene monomer or a thermoplastic elastic body rubber as a mixture thereof, and 3 to 10% by weight of mixed clay.

5 Claims, 3 Drawing Sheets

US 9,587,111 B2

POLYAMIDE COMPOSITE RESIN COMPOSITION FOR FUEL FILLER PIPE

CROSS-REFERENCE TO RELATED APPLICATION

This application claims under 35 U.S.C. §119(a) the benefit of priority to Korean Patent Application No. 10-2015-0084351, filed on Jun. 15, 2015 with the Korean Intellectual Property Office, the entire contents of which are incorporated herein by reference.

TECHNICAL FIELD

The present disclosure relates to a polyamide composite resin composition for a fuel filler pipe. More particularly, the present disclosure relates to a polyamide composite resin composition for a fuel filler pipe which may be easily blow-molded as a composite resin for a fuel filler pipe, has superior mechanical properties, and may greatly enhance gas barrier properties, by adding m-xylenediamine (MXD)-based modified nylon and mixed clay to polyamide 6.

BACKGROUND

Recently, fuel filler pipes face many technical challenges and have to cope with strict regulations on evaporative gas, and also satisfy compatibility with a lightweight material and biofuel according to $CO_2$ regulations. Plastic as a material of fuel filler pipes is suitable as a lightweight material, but barrier properties of components in an injection part of a fuel tank according to change in a composition of gasoline fuel due to addition of bio-ethanol are still in under development. Since component materials of conventional fuel tank injection parts include nylon and rubber, the materials have superior barrier properties against conventional gasoline, but weak barrier properties against alcohol.

In addition, in many countries, there is a need for development of materials having superior barrier properties due to strengthening of laws and regulations on evaporative gas. The permissible level of evaporative gas is 10 mg or less (F/Neck Ass'y 30 mg) with respect to E0 in Korea, 100 mg (EURO IV) with respect to E10 in Europe, and 2.5 mg (EPA Regulation Level III) with respect to E10 in North America.

Meanwhile, since high density polyethylene (HDPE) conventionally used as a resin for blow molding has a fuel barrier property of 68 g·mm/m²/day which is not excellent, the HDPE may be used through formation of a multilayered structure with an ethylene vinyl alcohol copolymer (EVOH). However, expensive multiple extruders should be used to form a multilayered structure, and a design meeting blow extrudability is required.

Accordingly, nylon-based resins having superior barrier properties may be used. However, polyamide 6 among nylon-based resins has superior barrier properties against gasoline but unsatisfactory low-temperature impact properties.

Therefore, there is a need for development of a material which may be easily blow-molded, may enhance impact resistance, tensile strength and gas barrier properties, and may be applied to components of an injection part of a fuel tank.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure confirmed that, by adding m-xylenediamine (MXD)-based modified nylon and mixed clay to polyamide 6, blow molding of a composite resin for a fuel filler pipe may be easily performed, superior mechanical properties, i.e., superior low-temperature impact resistance and tensile strength are exhibited, and gas barrier properties against gasoline and a mixed fuel including gasoline and alcohol may be greatly enhanced, thus completing the present disclosure.

Accordingly, it is an object of the present disclosure to provide a polyamide composite resin composition for a fuel filler pipe which may be easily blow-molded and exhibits superior mechanical properties such as superior low-temperature impact resistance and tensile strength.

It is another object of the present disclosure to provide a polyamide composite resin composition for a fuel filler pipe which may greatly enhance gas barrier properties against gasoline and mixed fuel including gasoline and alcohol.

In one aspect, the present disclosure provides a polyamide composite resin composition for a fuel filler pipe including 41 to 77% by weight of polyamide 6; 5 to 15% by weight of m-xylenediamine (MXD)-based modified nylon; 14 to 30% by weight of a maleic anhydride-grafted ethylene-octene copolymer, a maleic anhydride-grafted ethylene-propylene-diene monomer or a thermoplastic elastic body rubber as a mixture thereof; and 3 to 10% by weight of mixed clay.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
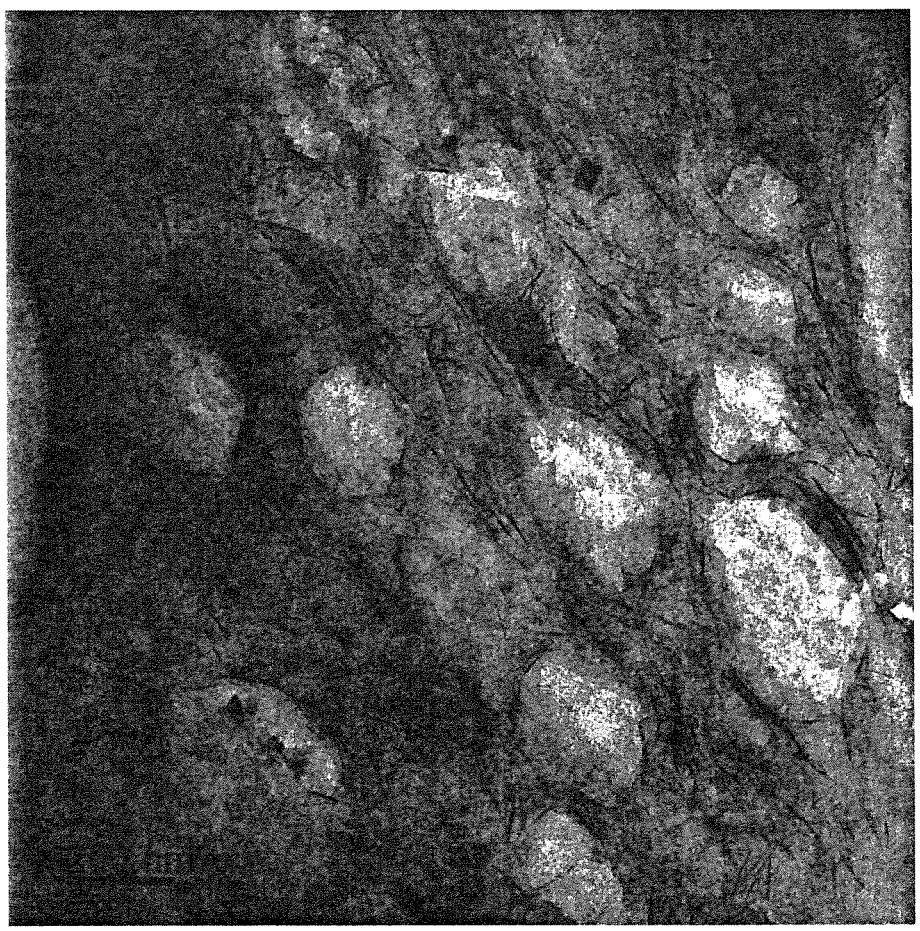
FIG. 1 illustrates a TEM image of a polyamide composite resin prepared according to Example 1 of the present disclosure.

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

A polyamide composite resin composition for a fuel filler pipe of the present disclosure may include 41 to 77% by weight of polyamide 6; 5 to 15% by weight of m-xylenediamine (MXD)-based modified nylon; 14 to 30% by weight of a maleic anhydride-grafted ethylene-octene copolymer, a maleic anhydride-grafted ethylene-propylene-diene monomer or a thermoplastic elastic body rubber as a mixture thereof; and 3 to 10% by weight of mixed clay.

According to a preferred embodiment of the present disclosure, the polyamide 6 as nylon 6 including diamine and dicarboxylic acid has superior barrier properties thereof against gasoline of 5 g·mm/m$^2$/day, and superior mechanical characteristics, chemical resistance and heat resistance. In addition, the polyamide 6 may be included in an amount of 41 to 77% by weight. When the content of the polyamide 6 is less than 41% by weight, chemical resistance, heat resistance and fuel barrier properties may be decreased. When the content of the polyamide 6 is greater than 77% by weight, low-temperature impact resistance and blow-molding properties may be decreased.

In addition, a maleic acid-based resin or an epoxy-based resin may be added to the polyamide 6 to increase the molecular weight of the polyamide 6, and polyamide 6 having an RV of 2.70 or more in a sulfuric acid solution may be used as the polyamide 6 of the present disclosure. Since blow molding is not performed due to problems of liquidity of a parison upon extrusion blow molding due to liquidity increase when RV 2.70 is used, the maleic acid-based resin or epoxy-based resin may be added to increase the molecular weight of polyamide. The added resin may control the molecular weight through a —NH functional group of a polyamide terminal and extrusion reaction with an epoxy-based resin or a maleic acid-based resin. As the polyamide 6, Grivoly BRZ 350 manufactured by EMS or Technyl C544 manufactured from Rhodia may be used. In addition, the polyamide 6 may partially include aromatic-based nylon having excellent barrier properties.

According to a preferred embodiment of the present disclosure, the m-xylenediamine (MXD)-based modified nylon is a material forming a dispersion layer and is a modified nylon having MI of 0.5 at 275° C. In addition, the m-xylenediamine (MXD)-based modified nylon forms a laminar dispersion layer when mixed with polyamide, thus having superior gas barrier properties. Since such a dispersion layer may be sensitively changed according to molding temperature, it is necessary to set a molding temperature to 275° C. or less. The m-xylenediamine-based modified nylon may be one or more selected from the group consisting of m-xylenediamine 6 nylon, aromatic nylon and amorphous nylon. In addition, the m-xylenediamine (MXD)-based modified nylon may be included in an amount of 5 to 15% by weight with respect to the polyamide composite resin composition for a fuel filler pipe. In particular, when the content of the m-xylenediamine (MXD)-based modified nylon is less than 5% by weight, a laminar structure for increasing gas barrier properties against gasoline and mixed fuel including gasoline and alcohol may be poorly formed, whereby gas barrier properties may be decreased. When the content of the m-xylenediamine (MXD)-based modified nylon is greater than 15% by weight, mechanical properties may be decreased.

According to a preferred embodiment of the present disclosure, the thermoplastic elastic body (thermoplastic olefin: TPO) rubber may be a maleic anhydride-grafted ethylene-octene copolymer, a maleic anhydride-grafted ethylene-propylene-diene monomer or a mixture thereof. In particular, the thermoplastic elastic body may be added to enhance dispersibility through reaction with a chain of the polyamide 6. In addition, since the size of a dispersed domain is decreased through dispersion force increase of the thermoplastic elastic body, compared with conventional ethylene-propylene-diene monomer (EPDM), impact resistance may be secured using a small amount of the thermoplastic elastic body. In addition, a laminar structure that blocks permeation of liquid or gas is not disturbed.

According to a preferred embodiment of the present disclosure, the thermoplastic elastic body rubber may be dispersed in a size of 1 to 10 μm using a twin-screw extruder. In addition, the thermoplastic elastic body rubber may be included in an amount of 14 to 30% by weight with respect to the polyamide composite resin composition for a fuel filler pipe. In particular, when the content of the thermoplastic elastic body rubber is less than 14% by weight, low-temperature impact resistance effects are low. When the content of the thermoplastic elastic body rubber is greater than 30% by weight, impact reinforcement properties may be decreased.

According to a preferred embodiment of the present disclosure, the mixed clay is an inorganic filler for reinforcing gas barrier properties of a matrix resin. The mixed clay may be microparticles having a size of 0.1 to 10 nm. The mixed clay may be a mixed clay wherein two or more clays selected from the group consisting of tabular montmorillonite, hectorite, saponite and vermiculite are mixed and immobilization-pretreated.

The immobilization-pretreated mixed clay may be prepared by pre-treating with an organic material after mixing two or more clays in a reactor upon clay preparation. The organic material may include a functional group selected from the group consisting of tertiary and quaternary ammonium, phosphonium, maleate, succinate, acrylate, benzylic hydrogen, dimethyl distearyl ammonium and oxazoline. The tertiary and quaternary ammonium may include bis(2-hydroxy-ethyl)methyl tallow ammonium or dimethyl hydrogenated-tallow ammonium. Preferably, an immobilization-pretreated mixed clay as an organic material having an alkylammonium function group may be used. For example, Cloisite 30B or Cloisite 93A may be used as the mixed clay. In particular, Cloisite 30B is montmorillonite immobilized with bis(2-hydroxy-ethyl)methyl tallow ammonium, and Cloisite 93A is montmorillonite immobilized with dimethyl hydrogenated-tallow ammonium.

Since such a mixed clay has better dispersibility than a single clay, the amount of organic material which has been treated in an excessively larger amount than a proper exchange reaction amount to assist dispersion upon immobilization pretreatment is decreased and thus heat stability is enhanced in a nanoscale composite, whereby a gas generation problem upon blow molding may be addressed.

The mixed clay may be used in an amount of 3 to 10% by weight. When the content of the mixed clay is less than 3% by weight, gas barrier effects are slight. When the content of the mixed clay is greater than 10% by weight, impact performance may be greatly decreased due to rapid increase of tensile strength and flexural strength, and elongation decrease.

According to a preferred embodiment of the present disclosure, the polyamide composite resin composition for a fuel filler pipe may further include 0.3 to 1.0% by weight of a heat stabilizer, 0.3 to 1.0% by weight of a lubricant, 0.3 to 1.0% by weight of a thickener and 0.1 to 1.0% by weight of a filler. In particular, the heat stabilizer may provide long-term heat resistance to components, and may include Group I metal halides or cuprous halides and cuprous iodine compounds on a periodic table such as sodium halides, potassium halides and lithium halides. In addition, the heat stabilizer may be one or more selected from the group consisting of hindered phenols, hydroquinones and aromatic amines. The lubricant functions as an internal lubricant and may induce smooth flow upon injection processing. The lubricant may be one or more selected from the group consisting of stearic acid, stearyl alcohol and stearamide. The thickener provides viscosity suitable for blow molding by increasing viscosity of nylon at extrusion temperature. The thickener may be one or more selected from the group consisting of vinyl, epoxy, methacryloxy, amino, mercapto, acryloxy, isocyanate, styryl and alkoxy oligomers. In addition, when the content of the thickener is less than 0.3% by weight, viscosity is not increased. When the content of the thickener is greater than 1.0% by weight, blow-molding properties may be decreased.

Accordingly, the polyamide composite resin composition for a fuel filler pipe according to the present disclosure may be easily blow-molded as a composite resin for a fuel filler pipe, exhibit superior mechanical properties, i.e., superior low-temperature impact resistance and tensile strength, and greatly enhance gas barrier properties against gasoline and a mixed fuel including gasoline and alcohol, by adding m-xylenediamine (MXD)-based modified nylon and mixed clay to polyamide 6.

EXAMPLES

The following examples illustrate the disclosure and are not intended to limit the disclosure.

Preparation Example

Preparation of Immobilization-Pretreated Mixed Clay

First, montmorillonite and hectorite were dispersed in water and impurities were removed therefrom. Montmorillonite and hectorite were mixed while stirring in a weight ratio of 1:1 at 60° C., thereby preparing a mixed clay dispersion. Subsequently, pH of the mixed clay in a reactor was adjusted to 4 to 5. Subsequently, dimethyl hydrogenated-tallow ammonium as tertiary ammonium having an alkyl ammonium functional group dissolved at 60° C. is added in an amount of 90 milliequivalents per 100 g of clay and reacted for approximately 20 minutes to one hour at 60° C. while stirring, thereby preparing a mixed clay. Subsequently, the mixed clay reacted using a filtering device was dried in a fluid dryer and prepared into a 10 to 40 micrometer powder using a milling device.

Examples 1 to 3 and Comparative Examples 1 to 9

To prepare a polyamide composite material of each of Examples 1 to 3 and Comparative Example 1 to 9, ingredients summarized in Table 1 below were mixed as disclosed in the table and then a twin-screw extruder was used. A resin, a rubber, a heat stabilizer, a lubricant and a thickener were input through a main feeder, and a clay immobilization-pretreated according to the preparation example was input through a side feeder. Since the mixed clay may be coagulated when the mixed clay is input through a main feeder, it is preferable to use a side feeder or a spraying method. An extruder screw having a chaotic kneading function may be used to enhance dispersibility. In addition, it is preferable to maintain extrusion temperature of a kneading process to 275° C. or less. When extrusion temperature is greater than 275° C., a domain size becomes too small and barrier properties may be decreased. Kneaded polyamide composite material was pelletized through a cutter and then dried using a humidifying dryer.

TABLE 1

| Classification | Comparative Examples | | | | | | | | | Examples | | |
|---|---|---|---|---|---|---|---|---|---|---|---|---|
| | 1 | 2 | 3 | 4 | 5 | 6 | 7 | 8 | 9 | 1 | 2 | 3 |
| Nylon 6 | 68 | 69 | 59 | 65 | 43 | 50 | 67 | 50 | 40 | 57 | 65 | 60 |
| MXD 6 | — | — | — | — | 30 | 23 | 3 | 20 | 30 | 10 | 10 | 10 |
| Nylon 6T | 10 | — | 10 | — | — | — | — | — | — | — | — | — |
| Rubber | — | — | — | — | — | — | — | — | — | 17 | — | — |
| Rubber-g-MA | 20 | 26 | 26 | 31 | 25 | 25 | 25 | 25 | 25 | 12 | 20 | 25 |
| Clay1 | — | 3.0 | 3.0 | 2.0 | — | — | — | — | — | — | — | — |
| Clay2 | — | — | — | — | — | — | 3.0 | 3.0 | 3.0 | 2.0 | 3.0 | 3.0 |
| Heat stabilizer | 0.4 | 0.4 | 0.4 | 0.4 | 0.4 | 0.4 | 0.4 | 0.4 | 0.4 | 0.4 | 0.4 | 0.4 |
| Lubricant | 0.4 | 0.4 | 0.4 | 0.4 | 0.4 | 0.4 | 0.4 | 0.4 | 0.4 | 0.4 | 0.4 | 0.4 |
| Thickener | 0.6 | 0.6 | 0.6 | 0.6 | 0.6 | 0.6 | 0.6 | 0.6 | 0.6 | 0.6 | 0.6 | 0.6 |
| Filler | 0.6 | 0.6 | 0.6 | 0.6 | 0.6 | 0.6 | 0.6 | 0.6 | 0.6 | 0.6 | 0.6 | 0.6 |

(Unit: % by weight)
Nylon 6: polyamide 6
MXD 6: m-xylenediamine (MXD) 6
Nylon 6T: polyhexamethylene terephthalamide 6T
Rubber: ethylene-octene copolymer
Rubber-g-MA: maleic anhydride-grafted ethylene-octene copolymer
Clay 1: montmorillonite clay
Clay 2: mixed clay in which montmorillonite and hectorite are mixed in a weight ratio of 1:1
Heat stabilizer: mixture of cuprous (cuprous) halide and metal halide
Lubricant: stearamide
Thickener: epoxy resin
Filler: carbon black masterbatch (CB/MB)

Test Example 1

In order to see properties, processability, gas barrier properties, etc. of the molded products prepared using the polyamide composite resins according to Examples 1 to 3 and Comparative Examples 1 to 9, items below were measured and the results are summarized in Tables 2 and 3 below and FIGS. 1 and 2.

(1) Tensile strength (MPa): Was measured at 50 mm/min based on ASTM D638.

(2) Flexural modulus (MPa): Was measured at 3 mm/min based on ASTM D790 regulation.

(3) IZOD impact strength (KJ/m$^2$): Was measured at low temperature (−30° C.) under a ¼" notched condition based on ASTM D256.

(4) Heat transformation temperature (° C.): Was measured by applying surface pressure of 0.45 MPa according to ASTM D648.

(5) Bending evaluation: Was measure by bending 10 times back and forth in a bending device.

(6) Low-temperature fall evaluation: Crack generation was measured through free fall from one meter height within 30 seconds or less after being left for three hours at low temperature of −40° C.

(7) Barrier property evaluation: a specimen having a constant thickness was installed in an upper portion of a fuel cup and a decreased fuel weight amount was measured according to time at 60° C. based on SAE J2665.

lonite clay is selectively dispersed in the nylon matrix, bending and gas barrier properties are poor.

In addition, it can be confirmed that, in the cases of Comparative Examples 5 to 6 in which the polyamide 6 and MXD 6 are included but the immobilization-pretreated mixed clay is not added, particularly impact strength and heat transformation temperature are significantly decreased.

In addition, it can be confirmed that, in the cases of Comparative Example 7 including a small amount of MXD 6 and Comparative Examples 8 and 9 including a large amount of MXD 6, tensile strength and flexural modulus are relatively superior, but impact strength and heat transformation temperature values are not good as in Comparative Examples 5 and 6.

On the contrary, it can be confirmed that, in the cases of Examples 1 to 3 including polyamide 6, MXD 6, maleic anhydride-grafted ethylene-octene copolymer rubber and mixed clay, blow molding is easily performed, particularly tensile strength and low-temperature impact strength are greatly enhanced, and flexural modulus and heat transformation temperature are similar to a conventional case. In addition, it can be confirmed that all gas barrier properties are superior by using a method wherein mixed clay is evenly dispersed in rubber and nylon.

Figure 2:
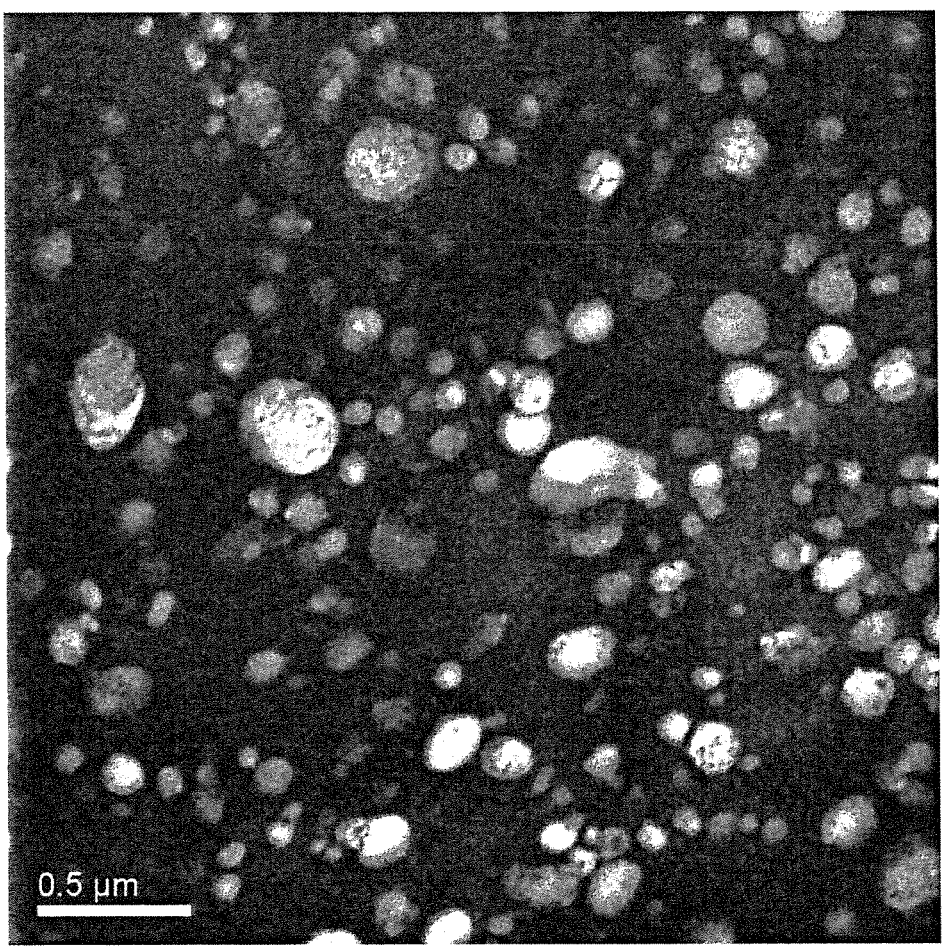
FIG. 2 illustrates an SEM image of a polyamide composite resin prepared according to Comparative Example 1 of the present disclosure.

FIG. 1 illustrates a TEM image of the polyamide composite resin prepared according to Example 1. As illustrated in FIG. 1, it can be confirmed that the immobilization-pretreated mixed clay is dispersed in the polyamide resin.

TABLE 2

| Classification | Comparative Examples | | | | | | | | | Examples | | |
|---|---|---|---|---|---|---|---|---|---|---|---|---|
| | 1 | 2 | 3 | 4 | 5 | 6 | 7 | 8 | 9 | 1 | 2 | 3 |
| Density | 1.06 | 1.06 | 1.06 | 1.04 | 1.05 | 1.06 | 1.06 | 1.06 | 1.06 | 1.04 | 1.04 | 1.05 |
| Tensile strength [MPa] | 49 | 46 | 44 | 43 | 44 | 43 | 54 | 49 | 51 | 55 | 59 | 61 |
| Flexural modulus [MPa] | 1916 | 1728 | 1655 | 1596 | 1356 | 1442 | 1819 | 1805 | 1842 | 1651 | 1651 | 1789 |
| Izod impact strength (−30° C.) [KJ/m$^2$] | 129 | 130 | 187 | 184 | 62 | 73 | 113 | 132 | 134 | 209 | 211 | 331 |
| Heat transformation temperature [° C.] | 180 | 181 | 168 | 181 | 58 | 62 | 174 | 106 | 128 | 185 | 185 | 186 |

TABLE 3

| Classification | Comparative Examples | | | | Examples | | |
|---|---|---|---|---|---|---|---|
| | 1 | 2 | 3 | 4 | 1 | 2 | 3 |
| Bending evaluation | Pass | NG | Pass | NG | Pass | Pass | Pass |
| Low-temperature fall evaluation | Pass | Pass | Pass | NG | Pass | Pass | Pass |
| Gas barrier property evaluation (g.mm/m2/day) | 15.2 | 25.0 | 30.5 | 32.5 | 2.5 | 2.7 | 2.0 |

As shown in Tables 2 and 3, it can be confirmed that Comparative Example 1 including the ethylene-octene copolymer rubber has the lowest low-temperature impact strength of approximately 130 kJ/m$^2$. In addition, it can be confirmed that, in the cases of Comparative Examples 2 to 4 including only the montmorillonite clay, particularly low-temperature impact strength and tensile strength are found low. Accordingly, it can be known that, since the montmoril- FIG. 2 illustrates an SEM image of the polyamide composite resin prepared according to Comparative Example 1. As illustrated in FIG. 2, it can be confirmed that MXD 6 is evenly dispersed in the maleic anhydride-grafted ethylene-octene copolymer rubber.

Test Example 2

In order to see a permeation degree of the molded product manufactured using the polyamide composite resin prepared according to each of Examples 2 and 3 and Comparative Example 1, a permeation degree of remaining fuel was measured in a 60° C. chamber based on SAE J2665 after injecting E10 fuel. Results are summarized in FIG. 3. Here, a permeation degree of remaining fuel is generally represented by weight/thickness/time, but specimen thicknesses are identically used in graphs of FIG. 3 and thus the specimen thicknesses are not separately represented.

Figure 3:
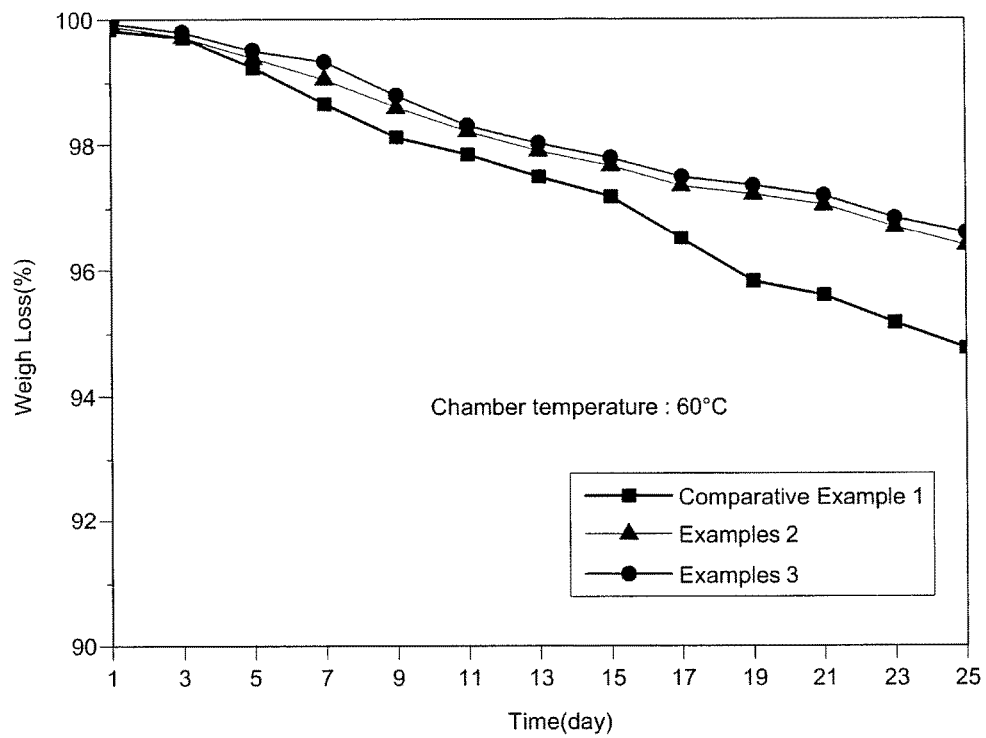
FIG. 3 illustrates a graph for fuel permeation barrier properties, which are measured by remaining fuel amounts, of molded products according to time using polyamide composite resins prepared according to Examples 2 and 3 and Comparative Example 1 of the present disclosure.
Figure 4:
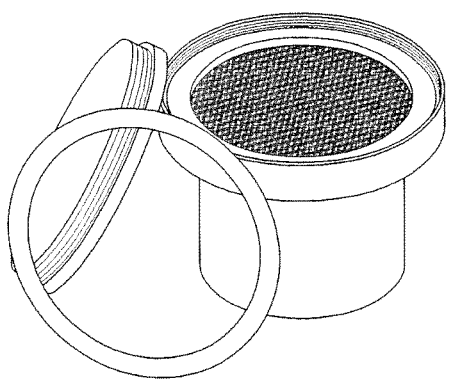
FIG. 4 illustrates a device used for measurement in a cup weight loss method according to SAE J2665 upon barrier property evaluation.

FIG. 3 illustrates a graph for a fuel permeation barrier property, measured as a remaining fuel amount, according to time of the molded product manufactured using the polyamide composite resin prepared according to each of Examples 2 and 3 and Comparative Example 1. As illustrated in FIG. 3, it can be confirmed that remaining fuel amounts in Examples 2 and 3 are greatly increased, compared to Comparative Example 1. Accordingly, it can be confirmed that, by adding the MXD 6, maleic anhydride-grafted ethylene-octene copolymer rubber and mixed clay to the polyamide 6, a laminar structure-shape layer is evenly formed, whereby fuel permeation degree is also enhanced.

Accordingly, it can be confirmed that, by adding the m-xylenediamine (MXD)-based modified nylon and mixed clay to the polyamide 6, the polyamide composite resin compositions prepared according to Examples 1 to 3 may be easily blow-molded as a composite resin for a fuel filler pipe, and superior mechanical properties, i.e., superior low-temperature impact resistance and tensile strength and greatly enhanced gas barrier properties may result.

A polyamide composite resin composition for a fuel filler pipe according to the present disclosure may be easily blow-molded as a composite resin for a fuel filler pipe, exhibit superior mechanical properties, i.e., superior low-temperature impact resistance and tensile strength, and greatly enhanced gas barrier properties against gasoline and a mixed fuel including gasoline and alcohol, by adding m-xylenediamine (MXD)-based modified nylon and mixed clay to polyamide 6.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polyamide composite resin composition for a fuel filler pipe, the polyamide composite resin comprising:
   41 to 77% by weight of polyamide 6;
   5 to 15% by weight of m-xylenediamine (MXD)-based modified nylon;
   14 to 30% by weight of a maleic anhydride-grafted ethylene-octene copolymer, a maleic anhydride-grafted ethylene-propylene-diene monomer or a thermoplastic elastic body rubber as a mixture thereof; and
   3 to 10% by weight of mixed clay.

2. The polyamide composite resin composition according to claim 1, wherein the m-xylenediamine (MXD)-based modified nylon is one or more selected from the group consisting of m-xylenediamine 6 nylon, aromatic nylon and amorphous nylon.

3. The polyamide composite resin composition according to claim 1, wherein the mixed clay is immobilization-pretreated through mixing two or more selected from the group consisting of tabular montmorillonite, hectorite, saponite and vermiculite.

4. The polyamide composite resin composition according to claim 3, wherein, in the immobilization pretreatment, pre-treatment into an organic material comprising one or more functional groups selected from the group consisting of tertiary and quaternary ammonium, phosphonium, maleate, succinate, acrylate, benzylic hydrogen, dimethyl distearyl ammonium and oxazoline is performed.

5. The polyamide composite resin composition according to claim 1, further comprising 0.3 to 1.0% by weight of a heat stabilizer, 0.3 to 1.0% by weight of a lubricant, 0.3 to 1.0% by weight of a thickener and 0.1 to 1.0% by weight of a filler.

* * * * *